US006973737B2

(12) United States Patent
Terrazas

(10) Patent No.: US 6,973,737 B2
(45) Date of Patent: Dec. 13, 2005

(54) BRUSHFIRE RATE OF SPREAD TOOL

(75) Inventor: Ralph M. Terrazas, San Pedro, CA (US)

(73) Assignee: City of Los Angeles, Los Angeles, CA (US)

( * ) Notice: Subject to any disclaimer, the term of this patent is extended or adjusted under 35 U.S.C. 154(b) by 0 days.

(21) Appl. No.: 10/639,928

(22) Filed: Aug. 12, 2003

(65) Prior Publication Data

US 2005/0034319 A1 Feb. 17, 2005

(51) Int. Cl.[7] .................................................. G01B 3/14
(52) U.S. Cl. .......................... 33/562; 33/494; 33/1 BB; 33/1 SB; 33/1 C
(58) Field of Search .......................... 33/562, 563, 1 C, 33/1 BB, 1 SB, 485, 494; 434/146, 150, 434/153

(56) References Cited

U.S. PATENT DOCUMENTS

| | | | | |
|---|---|---|---|---|
| 3,514,582 A | * | 5/1970 | Sanderson | 33/1 SB |
| 4,124,795 A | * | 11/1978 | LiCalsi | 235/70 A |
| 4,131,998 A | * | 1/1979 | Spears | 33/1 C |
| 4,217,696 A | * | 8/1980 | Schindler | 33/1 SB |
| 4,456,821 A | * | 6/1984 | Harter | 33/1 SD |
| 4,521,120 A | * | 6/1985 | Blank et al. | 374/102 |
| 5,404,648 A | * | 4/1995 | Taylor, Jr. | 33/563 |
| 5,537,752 A | * | 7/1996 | Cornwell et al. | 33/1 SB |
| 5,865,628 A | * | 2/1999 | Burns | 434/150 |
| 6,449,854 B1 | * | 9/2002 | Cheung | 33/562 |
| 6,556,981 B2 | * | 4/2003 | Pedersen et al. | 706/44 |
| 6,658,746 B2 | * | 12/2003 | Ganivet | 33/1 SB |
| 2004/0110515 A1 | * | 6/2004 | Blumberg et al. | 455/456.1 |

* cited by examiner

*Primary Examiner*—G. Bradley Bennett
*Assistant Examiner*—Travis Reis
(74) *Attorney, Agent, or Firm*—E. Nair Flores, Esq.; Greenberg Traurig, LLP

(57) ABSTRACT

A tool is triangular in shape and made of a clear plexi-glass. The tool contains two types of rate of spread scales, historical and real time. The historical rate of spread scale is based upon previous large-scale brushfires, while the real time scale utilizes GPS technology. The historical rate of spread scale is designed to address two brush fire environments. These environments are a brush fire occurring under Red Flag conditions and a brush fire occurring under Non-Red Flag conditions, and references are placed on the tool at each 30-minute time zone.

29 Claims, 5 Drawing Sheets

BRUSHFIRE RATE OF SPREAD TOOL

BACKGROUND OF THE INVENTION

Field of the Invention

This invention relates to a tool and method of using the tool for assisting in the control of brushfires.

Large-scale brushfire incidents are one of the most challenging events facing fire departments.

Brushfire incidents, due to their rapid onset, the proliferation of structures within the wildland urban interface, and narrow roadways are a recipe for disaster. History has shown that significant brushfires can result in catastrophic losses to life and property.

In a windy environment such as a Santa Ana condition in Southern California, the speed and intensity of a brushfire is overwhelming. The initial fire department resources responding to such an incident will be immediately tasked beyond their capabilities.

The first arriving Fire Chief Officer in charge of a brush assignment will have simultaneous demands of providing a "size-up", requesting additional resources, and implementing strategy and tactics, as well as considering the need for evacuation.

It is this potential need for evacuation that has led to the development of a brushfire rate of spread tool Prior to the tool of the invention, some fire officers had their own method of projecting a brushfire rate of spread. Others have lacked the experience to determine the rate of spread projection.

The tool and method of the invention seeks to provide fire officers with the skill to make a fact based estimation of a brushfire's potential rate of spread. This in turn provides valuable information in determining the need for an evacuation.

While the need for a brushfire evacuation is extremely rare, failure to assess the potential for an evacuation during a significant brushfire could lead to a significant loss of life.

The tool of the invention permits a means and method to quickly provide potential brushfire rate of spread information. With this information, an Incident Commander can make informed decisions in the effort to protect those residents who may reside within the path of the fire.

SUMMARY OF THE INVENTION

According to the invention a tool provides a geometric plotting element made of a substantially clear plexi-glass. The tool contains two types of rate of spread scales, historical and real time. The historical rate of spread scale is based upon previous large-scale brushfires, while the real time scale utilizes GPS technology.

The historical rate of spread scale is designed to address two brush fire environments. These environments are a brush fire occurring under Red Flag conditions and a brush fire occurring under Non-Red Flag conditions. The "RF" and "NRF" titles are placed at each 30-minute time zone.

The rate of spread tool ("R.O.S. Tool") comprises a triangular shaped element; and at least one type of rate of spread scale. Preferably there is at least one of historical and one of real time spread, related on the surface of the element. The triangular shaped element is dimensioned to be about 21" long and 10¼" wide at its base.

The invention is further described with reference to the accompanying drawings.

DETAILED DESCRIPTION OF THE INVENTION

Figure 1:
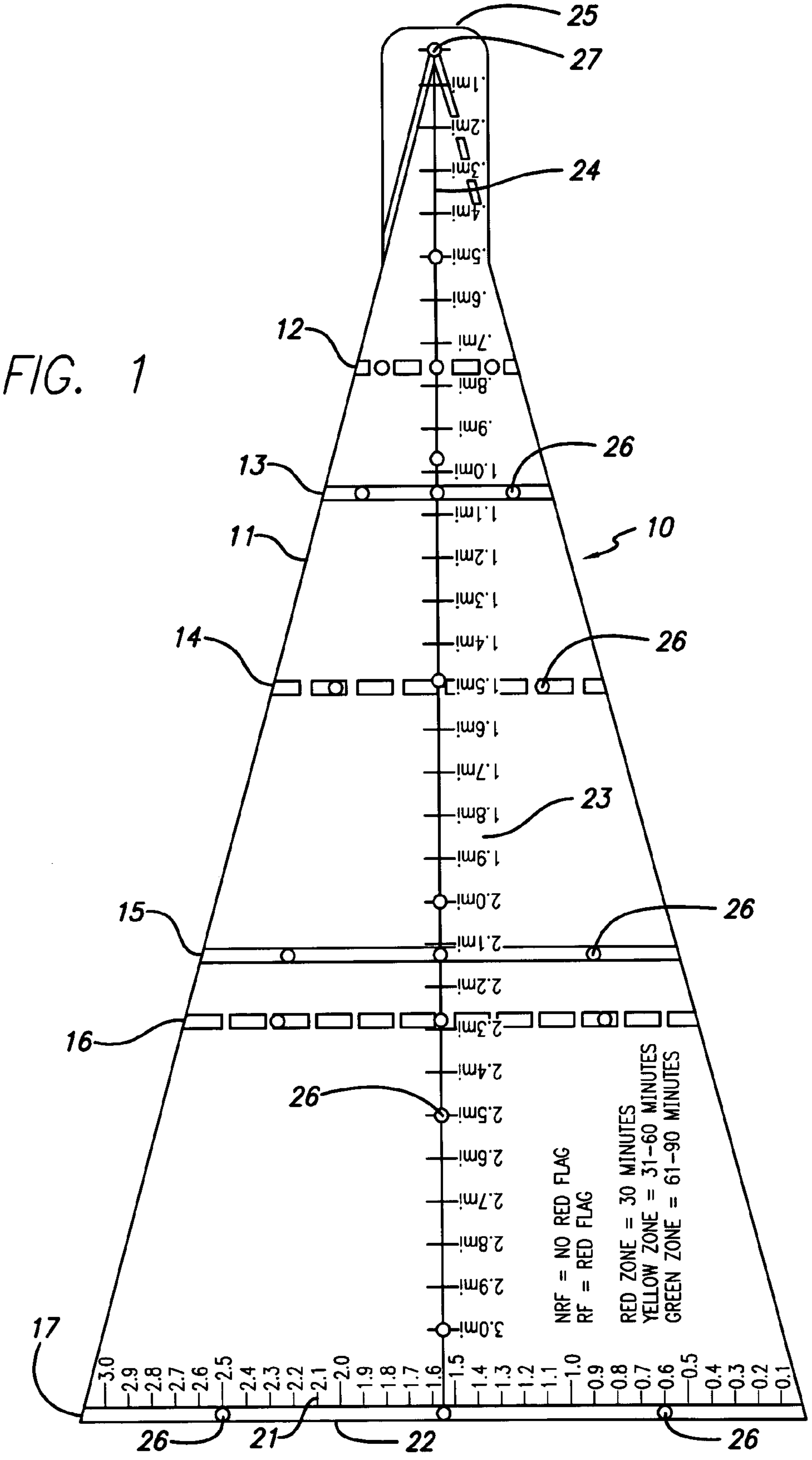
FIG. 1 is an exemplary plan view of the Brushfire Rate of Spread Tool.

The following description of the tool of the invention, and its mode of use is given as exemplary only of the invention, and the example is explained in relation to use by the Los Angles Fire Department ("LAFD") and the Los Angeles Police Department ("LAPD").

I. Theory

The R.O.S. Tool 10 is designed with the needs of the initial responding Chief Officers in mind. The tool can be quickly applied, it is durable, compatible with existing LAFD maps, as well as easy to store and access.

The R.O.S. Tool 10 is a mechanism for quickly translating historical and real time rates of fire spread under RED FLAG (RF) and NON-RED FLAG (NRF) conditions into a 90-minute time projection. The time projection is in the form of a triangle outline 11 placed upon an LAFD 800' map.

A red flag condition is defined as wind equal to 25 M.P.H.+ and relative humidity 15% or less. A non red flag condition is when the red flag thresholds for wind speed and/or relative humidity are not met.

The 90-minute projection is subdivided into three 30-minute time projections for the purpose of defining evacuation area responsibilities. The first 30-minute area is identified by red markings 12 and 13 and designates the area in which the LAFD has primary evacuation responsibility. Marking 12 is for an NRF condition and marking 13 is for an RF condition. The second and third 30-minute time projections are color-coded yellow and green, respectively. These serve to identify the areas in which the LAPD has primary evacuation responsibility. Yellow marking 14 is for an NRF condition, and yellow marking 15 is for an RF condition. Green marking 16 is for an NRF condition, and green marking 17 is for an RF condition. FIGS. 1, 2, 3 and 4 depict the 90-minute rate of spread projection method.

A triangle shape 10 was selected as the form in which to make a brushfire rate of spread projection due its common usage within the fire service to frame brushfires upon a map, as well as its compatibility with theoretical elliptical shape fire spread models. The insertion of an elliptical shape 18 within the triangle projection provides a margin for error in either lateral direction. This margin for error is necessary to compensate for variations of wind direction, topography and fuel type encountered within the 90-minute rate of spread projection.

Figure 5:
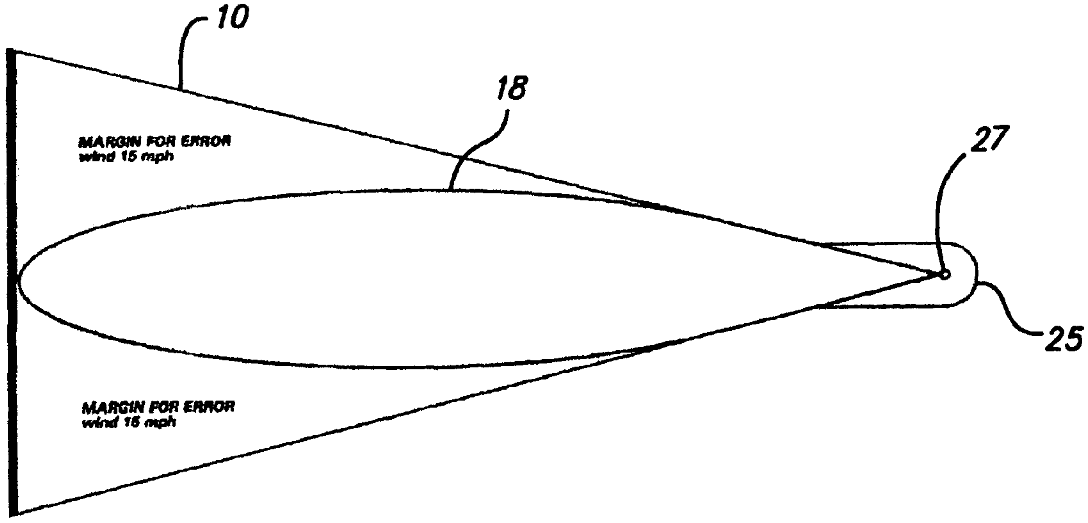
FIG. 5 depicts a fire spread model elliptical shape projected at 15 MPH.

The width of the triangle (at its midpoint under NRF conditions) is based upon a fire spread model elliptical shape 18 projected at 15 m.p.h. This model is depicted in FIG. 5. The margin for error is built into the design of the R.O.S. Tool.

Figure 6:
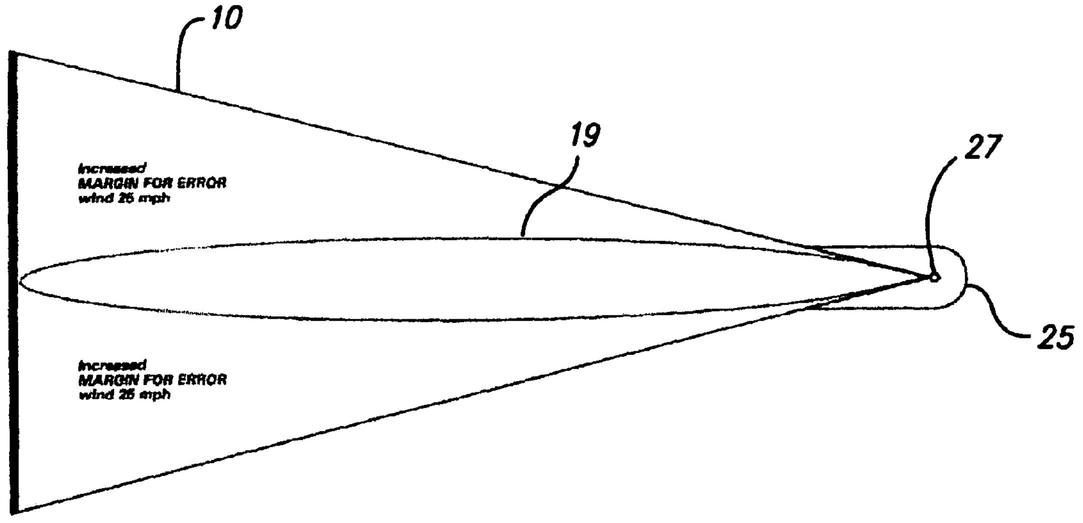
FIG. 6 depicts an arrangement where a margin of error is increased.

For a rate of spread projection under red flag conditions (wind 25 M.P.H.+) the same width is maintained. The width is constant under both RF and NRF conditions so that the margin for error is increased at higher wind speeds. Elliptical shape model projections narrow 19 as wind speed increases. Therefore, by maintaining the same width at a higher wind speed the margin of error is increased. FIG. 6 illustrates how the margin of error is increased.

The elliptical shapes 18 and 19 are merely starting points in determining the projected shape of a brush fire. In a theoretical setting, fuel, wind, and topography are constant factors, meaning that they will not change during the fire projection. Without any changes to these critical factors the fire will burn in a constant manner. However, this is unrealistic when applied to the urban-wildland interface setting.

The rate of spread for brushfires under RF and NRF has been determined by taking an average of the historical rates of spread of large urban-wildland interface fires in Central and Southern California. Historical data indicates that the average rate of spread for brush fires under red flag conditions is 2.1 M.P.H., under non red flag conditions the rate of spread is 1.5. M.P.H. Due to the variability of wind, topography and fuel during these large fires, these averages are considered a more accurate projection than under a theoretical setting.

Figure 7:
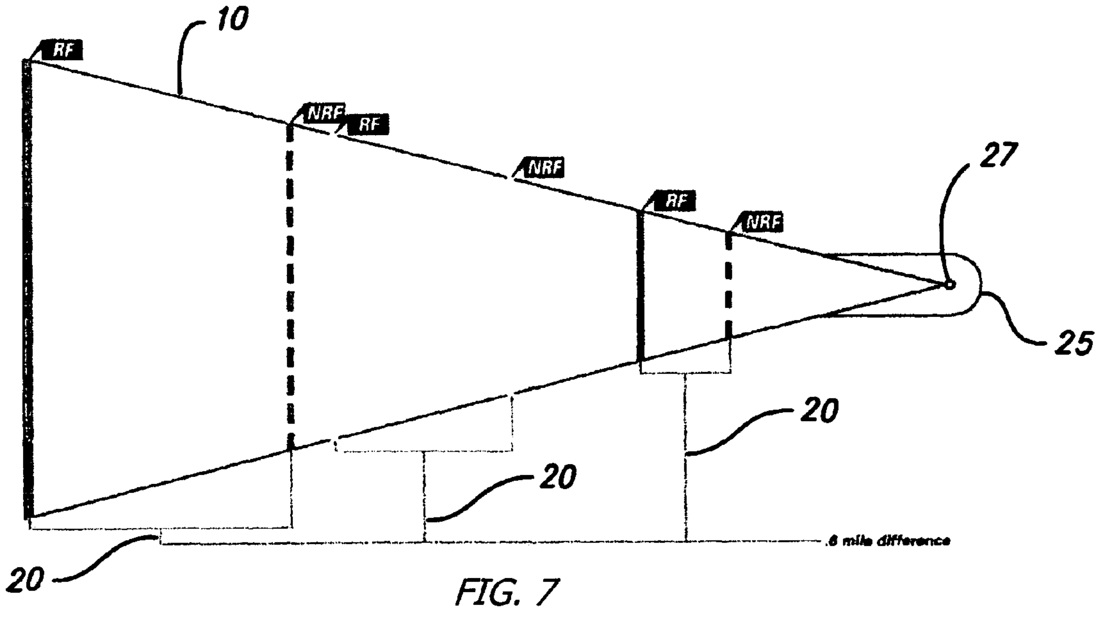
FIG. 7 depicts the use of the tool for different rates of spread.

FIG. 7 shows the how the R.O.S. Tool 10 projects each rate of spread. An RF projection extends farther as compared to an NRF projection. This 0.6 mile difference 20 within the projection is why it is critical that the right environment is selected for the projection, (RF versus NRF). Applying the RF projection on a day that does not meet red flag conditions could potentially result in the unnecessary evacuation of a significant number of residents.

Figure 2:
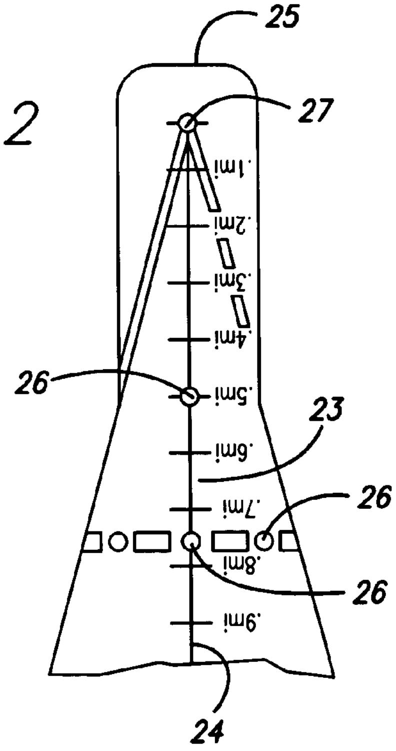
FIG. 2 is an enlarged plan view of one portion of the tool.
Figure 3:
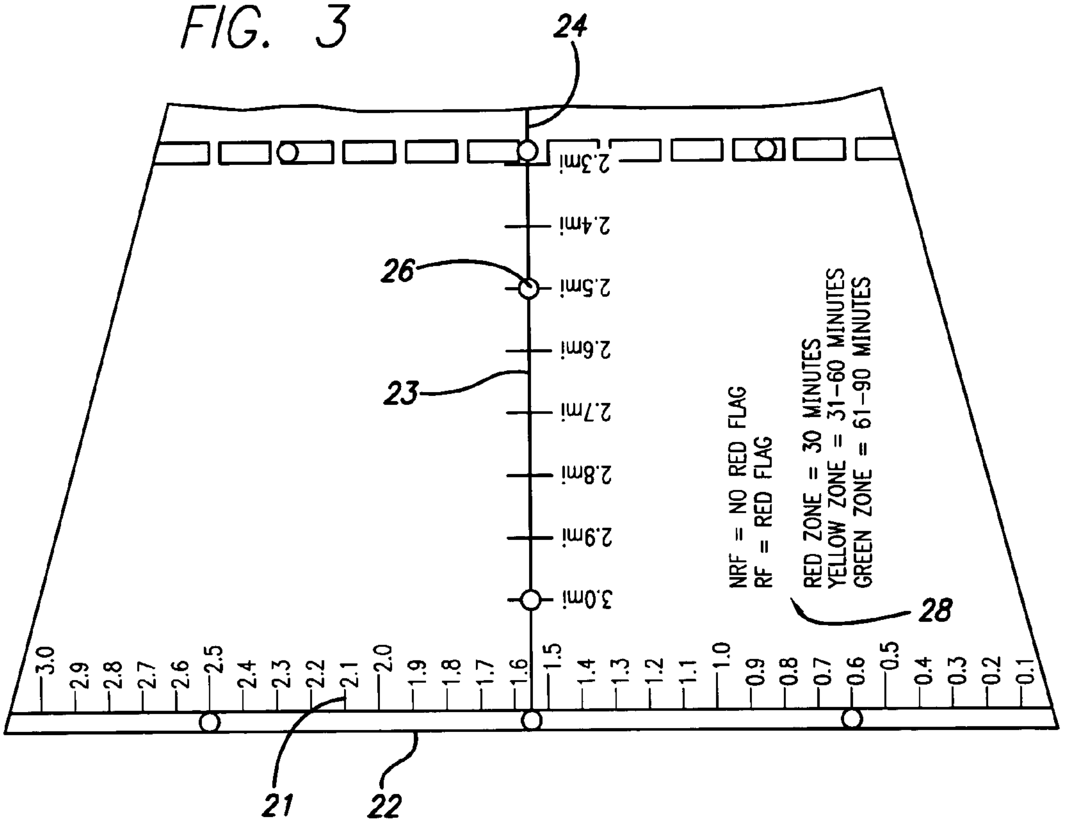
FIG. 3 is an enlarged plan view of another portion of the tool.
Figure 4:
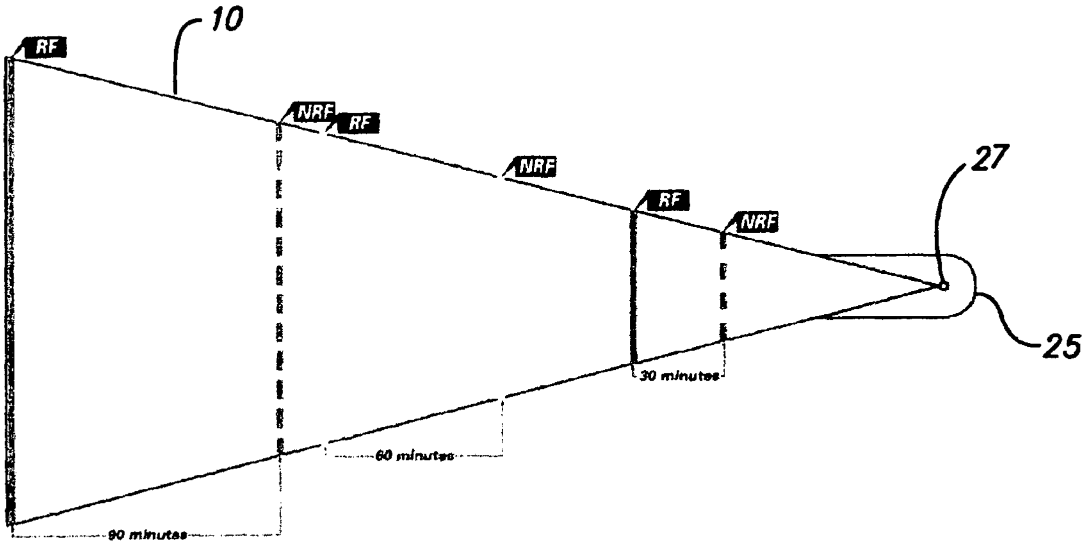
FIG. 4 depicts a 90 minute rate of spread projection method with the tool.
Figure 8:
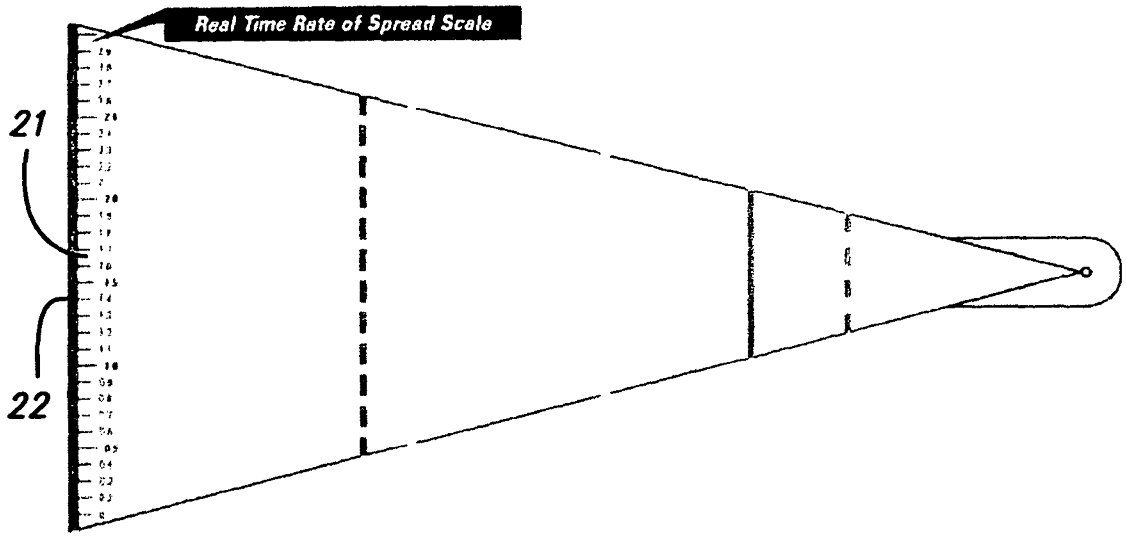
FIG. 8 to pick's use of the tool to project and real time rates of spread utilizing the scale located on the base of the tool.

When helicopter reconnaissance is available, the R.O.S. Tool can be used to project real time rates of spread by utilizing the scale 21 located in the base 22 of the R.O.S. Tool. This scale is shown in FIGS. 1, 2 and 8. This capability allows the tool 10 to make use of the most accurate brushfire projection possible, which is the actual or real time rate of spread. This scale 21 is calibrated into a 30-minute time frame.

Members assigned to Air Operations have been trained to utilize their onboard GPS to determine a real time rate of spread. Once determined, the Air Operations member will provide the real time rate of spread speed in M.P.H. to the user of the R.O.S. Tool, who will chart the rate of spread upon their map.

The R.O.S. Tool is 10 designed with the needs of the Incident Commander in mind. The tool 10 is fast and simple to apply. In a few minutes, after assessing wind and topography, a brush fire projection can be made. It is intentionally simplistic in its supporting theory. More complex software programs, may provide more accurate projections, but will require additional time, equipment and personnel. These resources are not available during a significant brush fire.

II. Description

The R.O.S. Tool 10 is triangular in shape, 21" long and 10¼" wide at its base 22. It is made of a clear plexi-glass that is 1/16th " thick. The R.O.S. Tool 10 contains two types of rate of spread scales, historical and real time. The historical rate of spread scale is based upon previous large-scale brushfires, while the real time scale utilizes GPS technology.

The historical rate of spread scale is designed to address two brush fire environments. These environments are a brush fire occurring under Red Flag conditions and a brush fire occurring under Non-Red Flag conditions.

The tool uses "RF" to indicate a red flag condition and "NRF" to indicate a Non-Red Flag condition. The "RF" and "NRF" titles are placed at each 30-minute time zone. The "RF" and "NRF" titles are further differentiated by the use of solid lines for the "RF" projection and hash marks for the "NRF" projection. It is critical that the user of the tool is knowledgeable of that day's condition due to the difference of the rate of spread for each scenario, which is 0.6 of a mile (2.1 M.P.H. under "RF" conditions compared to 1.5 MPH under "NRF" conditions).

To delineate 30-minute projections of fire spread, the triangular shape 11 is divided into three 30-minute times zones identified by red, yellow, and green markers. Therefore, the tool 10 has a maximum projection of 90 minutes from the point of application. The red markers 12 and 13 indicate the 0–30 minute time zone, the yellow markers 14 and 15 indicate the 31–60 minute time zone, and the green markers 16 and 17 delineate the 61–90 minute time zone.

The R.O.S. Tool 10 is oriented so that its text can be read for a fire moving from the east to west on a north oriented 800' LAFD map. This was done to address the probability that a large brushfire would occur during a "Santa Ana" condition. This however does not prevent the tool 10 from being used for fires traveling from west to east. In this circumstance, the tool can be turned in the opposite direction. All calibrations remain the same, while the text is upside down.

The base 22 of the tool contains the real time rate of spread scale 21 that is calibrated into a 30-minute time projection. Upon receipt of the real time rate of spread from LAFD helicopters, the user of the tool 10 can plot the real time projection from the current head of the fire. When the tool is used in this manner, the user must re-project each 30-minute time zone upon the LAFD 800' map. Multiple projections upon the same map will result in a map covered with various markings and therefore difficult to read. Therefore, a different color is used for each projection or if possible, another 800' map is utilized. Additional four-page 800' maps can be found on each on-scene Division and Battalion Command Vehicle.

In addition to the historical and real time rate of spread scales, the R.O.S. Tool 10 has distance indicators 23 to identify mileage. On its long axis 24 the tool has mileage markers for up to three miles. To gauge width, the tool 10 has at its center, a mileage marker indicating a ¼ mile distance in each direction from the centerline, for a total width gauge of ½ mile. If the fire's width exceeds a ½ mile, the three-mile mileage marker can be used by placing the tool, so that its long axis 24 is perpendicular to the fire's width.

The point 25 of the tool is "bull nose" in shape. This shape is necessary to prevent breakage of the tip when the tool 10 is being using in a pivoting motion while identifying lateral fire spread upon the map.

Holes 26 are arranged in the tool 10 and are sized to accommodate grease pencils. Four-page evacuation maps are laminated; therefore the grease pencil is an appropriate marker. To assist with the pivoting of the tool, a hole 27 was placed at the tip 25, so that a grease pencil can be used to anchor the tool 10 to the map when pivoting. Holes 26 are also placed upon each "RF" and "NRF" line marker. This is done to allow for the marking of each time zone upon the map, without removing the tool from the map surface. When all three time zones are marked in this manner, the tool can then be removed. The tool's straight edge is used to create a straight line by aligning the edge over the dots made through the holes 26 and drawing a straight line. Additional holes 26, spaced along the mileage marker at 0.5 mile intervals are for use when it is necessary to place two four page maps side by side. This may be necessary if the fire occurs on the edge of a map quadrant or if the fire extends beyond the area covered by the initial four-page map. By marking the 0.5 mile indicators across two maps, the marks can be used as a guide to place the tool in the appropriate location upon the second map.

A legend 28 is on the R.O.S. Tool for the purpose of defining "RF"—Red Flag Conditions, "NRF"—Non Red Flag Conditions and the red, yellow and green zones that indicate 30, 31–60, and 61–90 minute rate of spread projections.

The tool scale, which is 1"=800' is above the legend in bold letters to ensure that the correct map is used in conjunction with the tool. Incorrectly, using the LAFD 1200' map instead of the 800' map can result in a much larger, and inaccurate rate of spread projection.

The R.O.S. Tool 10 is located for distribution inside a weatherproof pouch. The pouch is designed to be located on the passenger side rear door of the Suburban Command Vehicles. Newer Command Vehicles are provided a drawer within the "fun package" designed to accommodate the 800' maps and the pouch contents. The storage method is configured this way to ensure quick access to the R.O.S. Tool, when engaged in a large scale brushfire.

The standard Brushfire Evacuation Pouch contents include:

Brush Fire Rate of Spread Tool
Brush Fire Rate of Spread Tool Instructions
Brush Fire Evacuation Contents Sheet
City of Los Angeles Evacuation Plan III. Indications for Use A practical scenario in which the R.O.S. Tool would be utilized, would be for a large-scale brushfire, with significant smoke showing, in an urban-wildland interface area. Under these circumstances, a later arriving Battalion Command team, would be the most appropriate resource to be assigned the task of projecting the path of a brush fire.

With the brush projection documented upon an LAFD 800' map, this information can be provided to the Incident Commander, who can utilize it to make tactical decisions as well as assess the need for an evacuation.

IV. Directions for Use

The Brushfire Rate of Spread Instructions are distributed with the R.O.S. Tool and are carried within the Brushfire Evacuation Pouch.

The instructions are designed to be utilized in sequential order and are intentionally limited to both sides of a single page. The R.O.S. Tool is designed with the needs of the initial responding Chief Officers in mind. The tool by design is fast to apply and easy to use.

The following is a summary of the Brushfire Rate of Spread Tool Instructions. For more in-depth instructions, the detailed Brushfire Rate of Spread Instruction sheet should be reviewed.

1. Respond to the Command Post location
2. Determine if Red Flag or Non Red Flag conditions exist.
3. Assess on-scene wind direction.
4. Assess on-scene topography.
5. Apply R.O.S. Tool to LAFD map.
6. Provide copies of map projection to significant Officers.
7. Upon arrival of Helicopter Command Ship, determine real time projection.
8. Establish perimeter of the fire.
9. Keep the Incident Commander informed of the fire's progress.

The Command Team responsible for the formulation of the 90-minute brushfire projection, may also be responsible for the development of a Brushfire Evacuation Plan which would be carried out by another Battalion Command Team who would be known as the Evacuation Group Leader.

The evacuation plan should include information such as the physical location of the fire, the type of the evacuation (Warning, Voluntary, Mandatory, Shelter-in-place), the TAC channel, additional resources, primary and secondary staging locations, primary and secondary shelter locations, safe refuge areas, evacuation routes, and the notification of appropriate outside agencies. To assist in the development of this plan, a Brushfire Evacuation Plan Checklist is used, and is located with the tool.

V. General

Spot Fires—The R.O.S. Tool does not address the potential for spot fires. The R.O.S. Tool estimates the rate of spread for the main front of the fire.

As a brushfire intensifies, fire spotting may result. Spotting is the result of firebrands being carried by convective action and/or wind. There are two types of spotting; they are short-range and long-range. Short-range spotting is defined as spotting that is quickly overrun by the main front of the fire. Long-range spotting is anything that does not meet the short-range definition. Spotting usually occurs downwind, and may smolder for hours before initiating a fire.

One of the worst types of firebrands are those produced by shake shingle roofs. The shape of a firebrand from a shake shingle roof is large and flat, allowing them to be easily carried downwind.

If a long-range spot fire were to occur, it should be treated as the start of another main fire front. This approach will require the user of the R.O.S. Tool to make another 90-minute projection of the fire.

Lateral Spread—The incorrect assessment of local topography, a change in wind direction, or the inability to attack the flanks of the fire will result in lateral spread of the fire beyond the projected width dimensions. This potential scenario should be considered likely to occur, rather than an exception. For this reason, a margin of error is built into the R.O.S. Tool and the tip of the tool was reinforced to allow for pivoting of the tool to encompass lateral fire spread. When documenting lateral fire spread upon the 800' map, after the initial projection has been made, it is important to note the 30-minute time zones in the newly defined area. Failure to do so will result in a projection without red, yellow, and green time parameters.

False Sense of Security—The R.O.S. Tool provides a specific projection of a fire's rate of spread at one moment in time. It is critical that receivers of this projection understand that a brushfire is not a static event. The fire is a dynamic experience; it is traveling in one direction or another at various speeds. Therefore, individuals within each of the 30-minute zones should be continually moving away from the fire's main front. A way to ensure that this error is prevented is to subdivide the 30-minute projections into shorter intervals, such as 10 to 15 minute increments and to continually communicate to field units the fire's progress. This action will keep field units aware of the fire's progression, and allow them the opportunity to stay ahead of the fire's front.

Space Requirement—The Command Team assigned the Planning/Fire Behavior Specialist task will need as much space as possible. Space is required due to the need to lay out flat an LAFD 800' map, the Wildland Operational Guide aerial photos, R.O.S. Tool Instructions, the Brushfire Evacuation Plan Checklist, as well as multiple handi-talkie radios, which may be needed to monitor multiple TAC Channels. Additionally, LAPD personnel assigned to work with the Command Team will need a small work area for their radios and maps.

To address the space issue, a piece of wood approximately 30"×30" can be used to extend the working area in the rear of the Command Vehicle. By extending the two drawers within the "fun package" and placing the wood on top of them, the work area is nearly doubled.

VI. Glossary of Terms

Elliptical Shape: A shape best described as a flattened oval.

Fire Behavior Specialist: A technical specialist in the area of fire behavior.

"Fun" Package: Term used to identify cabinetry located in the rear of all LAFD Suburban Command Vehicles.

Global Positioning System (GPS): A constellation of satellites that orbit the earth transmitting precise time and position information.

Head of the fire: Term used to identify the main front of a brushfire.

Incident Commander: The individual responsible for the management of all incident operations at the incident site.

Lateral Spread: Term used to indicate that a brushfire is widening its path from the point of origin.

Non-Red Flag Alert Condition: Any condition which fails to meet Red Flag Alert thresholds for wind speed and humidity.

Planning Section Chief: Individual responsible for the collection, evaluation, and dissemination of tactical information related to the incident, and for the preparation and documentation of Incident Action Plans.

Process Patent: A type of patent that identifies ownership of a system or process.

Rate of Spread: The speed at which a brushfire travels.

Rate of Spread (R.O.S.) Tool: A tool designed to quickly determine the potential brushfire rate of spread.

Red Flag Alert Condition: An elevated level of brushfire threat when wind speed is 25+M.P.H. and humidity is 15% or less.

Spot Fires: Fires that are created by fire embers traveling beyond the main body of fire.

Wildland Operational Plan: A comprehensive system to divide wildland urban interface areas on the City into manageable operational deployment areas.

Wildland Interface Area: An area where structures have the potential to be threatened by wildland fires.

VII. Conclusion

The Brushfire Rate of Spread Tool is an attempt to quantify the potential spread of a significant brushfire within the City of Los Angeles. The tool uses historical data to make an initial 90-minute brushfire rate of spread projection as well as GPS technology to indicate the real time rate of spread.

Many other forms of the invention each differing for the other in matters of detail only. For instance, geometrical shapes different to the triangular shape could be used. A different number of holes could be used. Different scales could be used. Different indicators could be used on the tool.

The invention is to be determined by the following claims:

I claim:

1. A rate of spread tool comprising:

a geometric plotting element;

at least one historical rate of spread scale and at least one real time rate of spread scale, related on the surface of the element, wherein, in use, the tool is oriented so that the scales on the tool is readable for a moving fire depicted on a map.

2. A tool as claimed in claim 1 wherein the geometrical plotting element is a triangular shaped element and is dimensioned to be about 21" long and about 10¼" wide at its base.

3. A tool as claimed in claim 1 wherein the historical rate of spread scale is based upon previous large-scale brushfires, and the real time scale utilizes GPS technology.

4. A tool as claimed in claim 3 wherein the historical rate of spread scale is designed to address two brush fire environments, the environments being a brush fire occurring under Red Flag conditions and a brush fire occurring under Non-Red Flag conditions.

5. A tool as claimed in claim 4 wherein the Red Flag and Non-Red Flag conditions are marked by indicators, the indicators being placed at selected time intervals, selectively at about 30-minute apart time zones.

6. A tool as claimed in claim 5 wherein the delineation of 30-minute projections of fire spread is effected by dividing the triangular shape into three 30-minute times zones.

7. A tool as claimed in claim 4 Including holes placed at Red Flag and Non Red Flag demarcations.

8. A tool as claimed in claim 1 wherein, in use, the tool is oriented so that text on the tool is readable for a fire moving transversely on a north oriented map.

9. A tool as claimed in claim 1 wherein the base of the tool contains the real time rate of spread scale that is calibrated into a 30-minute time projection.

10. A tool as claimed in claim 1 wherein, in use, upon receipt of the real time rate of spread from an observation source, the real time projection from the current head of the fire is plotted.

11. A tool as claimed in claim 1 wherein, in use, the tool is used for multiple projections upon the same map, and selectively different colors are used for different projections.

12. A tool as claimed in claim 1 wherein the tool includes historical and real time rate of spread scales, and distance indicators to identify mileage.

13. A tool as claimed in claim 1 wherein on a long axis of the tool there are mileage markers.

14. A tool as claimed in claim 1 wherein there is a marker to gauge width, including at its center, a mileage marker indicating a predetermined distance in each direction from the centerline, and wherein in use the long axis is perpendicular to a fire's width.

15. A tool as claimed in claim 1 wherein the tool contains at least one tip about which the tool is pivotable, the tip of the tool being blunted in shape, the shape being selected to reduce the tendency of breakage of the tip when the tool is used in a pivoting motion while identifying lateral fire spread upon the map.

16. A tool as claimed in claim 1 including at least one hole in the face of the tool, the holes being sized to accommodate a marker instrument.

17. A tool as claimed in claim 1 wherein, in use, when at least one, and preferably three, time zones are marked, the tool is removed, and a straight edge of the tool is used to create a straight line by aligning the edge over the dots to permit the drawing of a straight line.

18. A tool as claimed in claim 1 including holes, spaced along mileage markers on the tool at predetermined distance intervals for use when using multi-page page maps.

19. A tool as claimed in claim 1 wherein a tool scale is employed to ensure a correlating map is used in conjunction with the tool.

20. A rate of spread tool comprising:

a selected geometrically shaped element;

at least one historical rate of spread scale and at least one real time rate of spread scale, related on the surface of the element; and and the real time scale utilizes GPS technology.

21. A tool as claimed in claim 20 wherein the delineation of defined time projections of fire spread is effected by dividing the shape into selected predetermined times zones, and wherein, in use, the tool is oriented so that text on the tool is readable for a fire moving fins predetermined direction.

22. A tool as claimed in claim 20 wherein the base of the tool contains the real time rate of spread scale that is calibrated into defined time projections, and wherein, in use, upon receipt of the real time rate of spread from an observation source, the real time projection from the current head of the fire is plotted.

23. A tool as claimed in claim 20 wherein the tool includes historical and real time rate of spread scales, and distance indicators to identify mileage.

24. A tool as claimed in claim 20 wherein there is a marker to gauge width, including at its center, a distance marker indicating a predetermined distance in each direction from the centerline, and wherein in use the long axis is perpendicular to the fire's width.

25. A tool as claimed in claim 20 wherein the tool contains at least one tip about which the tool is pivotable, the tip of the tool being blunted in shape, the shape being selected to reduce the tendency of breakage of the tip when the tool is used in a pivoting motion while identifying lateral fire spread upon the map.

26. A tool as claimed in claim 20 including at least one hole in the face of the tool, the holes being sized to accommodate a marker instrument.

27. A tool as claimed in claim 20 wherein, in use, when at least one, and preferably three, time zones are marked.

28. A tool as claimed in claim 20 including holes, spaced along distance markers on the tool at predetermined distance intervals, and wherein a tool scale is employed to ensure a correlating map is used in conjunction with the tool.

29. A rate of spread tool comprising:

a geometric plotting element;

at least one type of rate of spread scale, selectively being at least one of an historical time and real time, related on the surface of the element, wherein, in use, the tool is oriented so that the scales on the tool is readable for a moving fire depicted on a map; and wherein said rate of spread tool is an essentially triangular shape.

* * * * *